(12) United States Patent
Kobori

(10) Patent No.: US 9,975,524 B2
(45) Date of Patent: May 22, 2018

(54) WIPER CONTROL APPARATUS

(71) Applicant: Mitsuba Corporation, Gunma (JP)

(72) Inventor: Narimitsu Kobori, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days. days.

(21) Appl. No.: 15/501,451

(22) PCT Filed: Aug. 5, 2015

(86) PCT No.: PCT/JP2015/072195
§ 371 (c)(1),
(2) Date: Feb. 3, 2017

(87) PCT Pub. No.: WO2016/021626
PCT Pub. Date: Feb. 11, 2016

(65) Prior Publication Data
US 2017/0225659 A1 Aug. 10, 2017

(30) Foreign Application Priority Data

Aug. 6, 2014 (JP) .................................. 2014-160300

(51) Int. Cl.
*B60S 1/48* (2006.01)
*B60S 1/52* (2006.01)
*H02P 3/06* (2006.01)

(52) U.S. Cl.
CPC ............... *B60S 1/485* (2013.01); *B60S 1/482* (2013.01); *B60S 1/524* (2013.01); *H02P 3/06* (2013.01)

(58) Field of Classification Search
CPC .. B60S 1/52; B60S 1/524; B60S 1/482; B60S 1/483; B60S 1/485; H02P 3/06
(Continued)

(56) References Cited

U.S. PATENT DOCUMENTS 5,819,360 A    10/1998   Fujii
5,944,910 A    8/1999   Fujii
(Continued)

FOREIGN PATENT DOCUMENTS

JP    H07-037836 U    7/1995
JP    H07-329768 A    12/1995
(Continued)

OTHER PUBLICATIONS

International Search Report for PCT Serial No. PCT/JP2015/072195 dated Sep. 18, 2015.
(Continued)

*Primary Examiner* — Gary Graham
(74) *Attorney, Agent, or Firm* — McCormick, Paulding & Huber LLP

(57) ABSTRACT

When an ECU 41 for wiper motor detects that a SP operation has been carried out in the midst of swinging motion of a wiper blade, the ECU 41 for wiper motor outputs a motor stopping signal to an ECU 42 for washer pump. When the ECU 42 for washer pump receives the motor stopping signal, the ECU 42 for washer pump stops a washer pump 30 even if an injection switch for jetting out washer fluid is on. In this manner, when a wiper blade is stopped from being swung for replacement of the wiper member, the pump for causing washer fluid to jet out is stopped. Therefore, it is possible to prevent the waste of washer fluid, and to further save washer fluid.

3 Claims, 12 Drawing Sheets

(58) Field of Classification Search
USPC .......................................... 15/250.02–250.04
See application file for complete search history.

(56) References Cited

U.S. PATENT DOCUMENTS

| | | | |
|---|---|---|---|
| 9,333,951 B2* | 5/2016 | Pyun | ....................... B60S 1/487 |
| 2007/0029961 A1 | 2/2007 | Harita et al. | |
| 2010/0037416 A1 | 2/2010 | Amagasa et al. | |
| 2013/0081221 A1 | 4/2013 | Amagasa et al. | |
| 2013/0207577 A1 | 8/2013 | Natsume | |

FOREIGN PATENT DOCUMENTS

| | | |
|---|---|---|
| JP | H09-142262 A | 6/1997 |
| JP | 2003-146187 A | 5/2003 |
| JP | 2008-155833 A | 7/2008 |
| JP | 2013-163454 A | 8/2013 |

OTHER PUBLICATIONS

Supplementary European Search Report for Serial No. EP 15 82 9429 dated Feb. 9, 2018.

* cited by examiner

WIPER CONTROL APPARATUS

CROSS-REFERENCE TO RELATED APPLICATIONS

This application is a National Stage application of International Patent Application No. PCT/JP2015/072195, filed on Aug. 5, 2015, which claims priority to Japanese Patent Application No. 2014-160300, filed on Aug. 6, 2014, each of which is hereby incorporated by reference in its entirety.

TECHNICAL FIELD

The present invention relates to a wiper control apparatus having a wiper member for wiping a subject surface of a windshield, a washer nozzle disposed on the wiper member, and a controller which controls jetting of washer fluid from the washer nozzle.

BACKGROUND ART

A vehicle such as automotive vehicle is equipped with a wiper apparatus ensuring a field of view from a driver, etc., through a windshield. The wiper apparatus includes a wiper member for wiping a subject surface of the windshield, and a wiper motor which swings the wiper member. By operating a wiper switch, etc., in a vehicle interior to drive the motor, the wiper member is swung on the subject surface so as to wipe rainwater, etc., away from the subject surface.

For example, when foreign substance such as dust is on the subject surface, the wiper member is driven to be swung while washer fluid is jetted onto the subject surface, so that the wiper member wipes foreign substance away from the subject surface, In this process, foreign substance such as dust is wetted and wiped out completely without scratching the subject surface. Usually, washer fluid is jetted from a washer nozzle disposed on the hood, etc., of the vehicle, onto the subject surface. This case has a disadvantage that an injection-target location of washer fluid is in front of the driver and therefore blocks the field of view from the driver through a windshield, that because of long distance between the washer nozzle and the subject surface, the injection-target location of washer fluid is shifted by an aerodynamic drag, etc., and that because of use of a relatively large amount of washer fluid, a washer tank is refilled frequently with washer fluid.

In order to overcome the above disadvantages, for example, a wiper apparatus described in Japanese Patent application Laid-Open Publication No.: H09-142262 has been developed. The wiper apparatus described in Japanese Patent application Laid-Open Publication No.: H09-142262 has an attachment nozzle attached to a forward wiping side face of a wiper blade, and causes the attachment nozzle to jet washer liquid, thereby wetting the vicinity of the wiper blade while saving washer liquid. According to the wiper apparatus, timing of jetting washer liquid is determined by a timer or by turning on/off a cam switch to be operated according to a swinging angle of an arm. It is possible to further save washer liquid.

SUMMARY

According to the wiper apparatus described in Japanese Patent application Laid-Open Publication No.: H09-142262, however, when the wiper apparatus as well as a washer pump (pump) is on operation, the wiper apparatus performs control for keeping the washer pump operating even if the arm (wiper) is stopped from being swung for a certain reason. This may lead to a case where the washer liquid (washer fluid) is wasted unnecessarily. It is therefore necessary to provide a device capable of further saving washer fluid.

An object of the present invention is to provide a wiper control apparatus capable of further saving washer fluid.

According to an aspect of the present invention, there is provided a wiper control apparatus, comprising: a wiper member for wiping a subject surface; a wiper motor for swinging the wiper member; a first controller for driving the wiper motor; a washer nozzle disposed on the wiper member; a pump which causes washer fluid to jet out from the washer nozzle; and a second controller which drives the pump, wherein when detecting that the wiper member is stopped in the midst of a wiping action, the first controller outputs a motor stopping signal to the second controller, when receiving the motor stopping signal, the second controller stops the pump even if an injection switch for jetting out washer fluid is on.

According to another aspect of the present invention, the washer nozzle is composed of a forward-side washer nozzle disposed on a forward-end side of the wiper member, and a backward-side washer nozzle disposed on a backward side of the wiper member, when the injection switch is operated, and the wiper member is moved in a forward direction, the second controller rotates the pump in a normal direction, thereby causing the forward-side washer nozzle to jet out washer fluid, when the injection switch is operated, and the wiper member is moved in a backward direction, the second controller rotates the pump in a reverse direction, thereby causing the backward-side washer nozzle to jet out washer fluid.

According to another aspect of the present invention, the motor stopping signal is a stop signal to be used to stop the wiper member at an upper return position on the subject surface at the time of replacement of a wiper blade.

According to another aspect of the present invention, the motor stopping signal is a power supply cutoff signal to be used to cut off power supply to the motor when a source voltage takes an abnormal voltage value, or when the wiper member is incapable of being moved because of obstacle.

According to the present invention, when detecting the wiper member is stopped in the midst of swinging motion, the first controller outputs a motor stopping signal to the second controller. When receiving the motor stopping signal, the second controller stops the pump even if the injection switch for jetting out washer fluid is on.

In this manner, when the wiper member is stopped from being swung for a certain reason, the pump that causes washer fluid to jet out is also stopped. This prevents the waste of washer fluid, thus allowing further saving of washer fluid.

DETAILED DESCRIPTION

Hereinafter, the first embodiment of the present invention will be described in detail with reference to the drawings.

Figure 1:
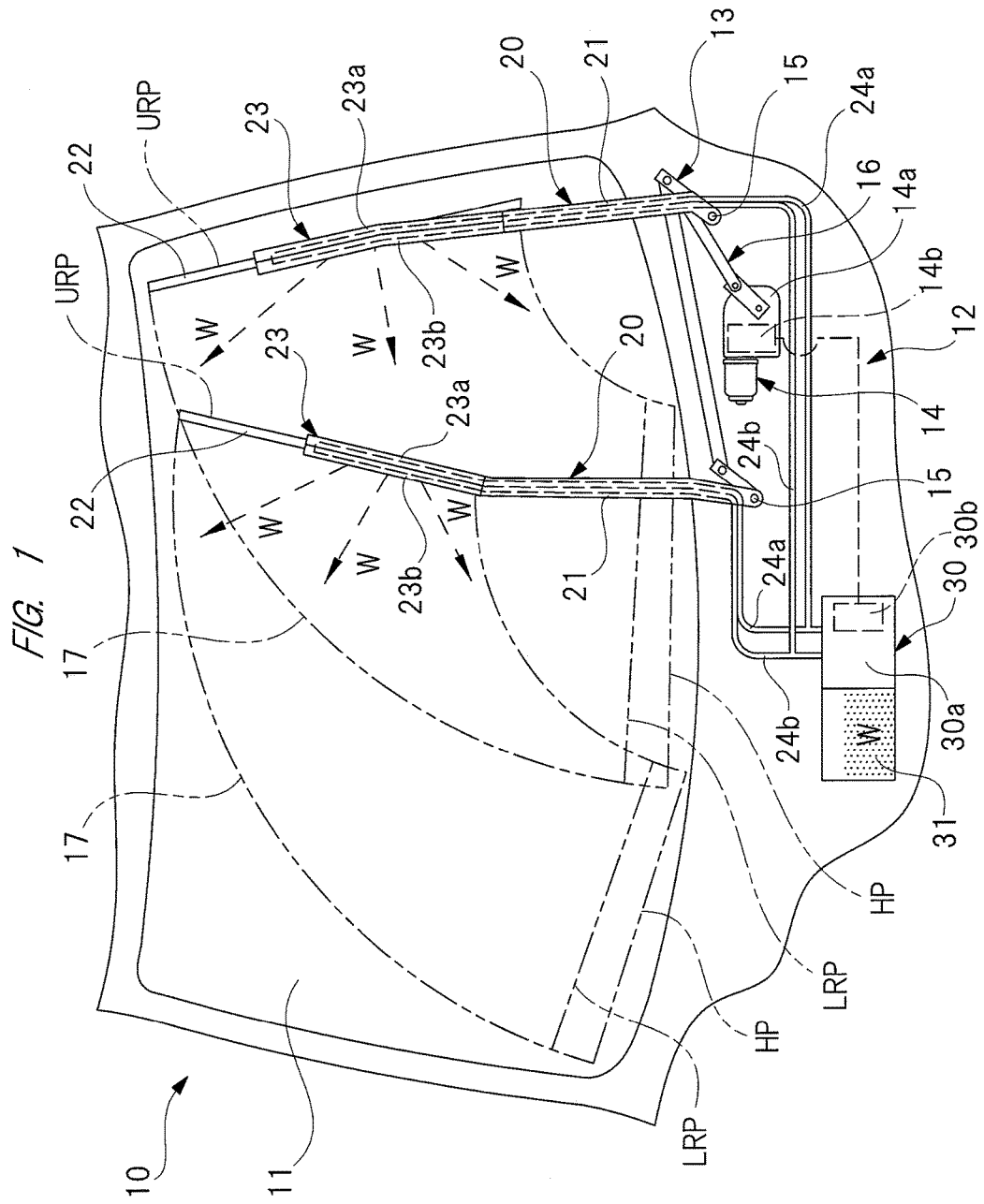
FIG. 1 is a schematic view of a wiper control apparatus disposed on a vehicle.
Figure 2:
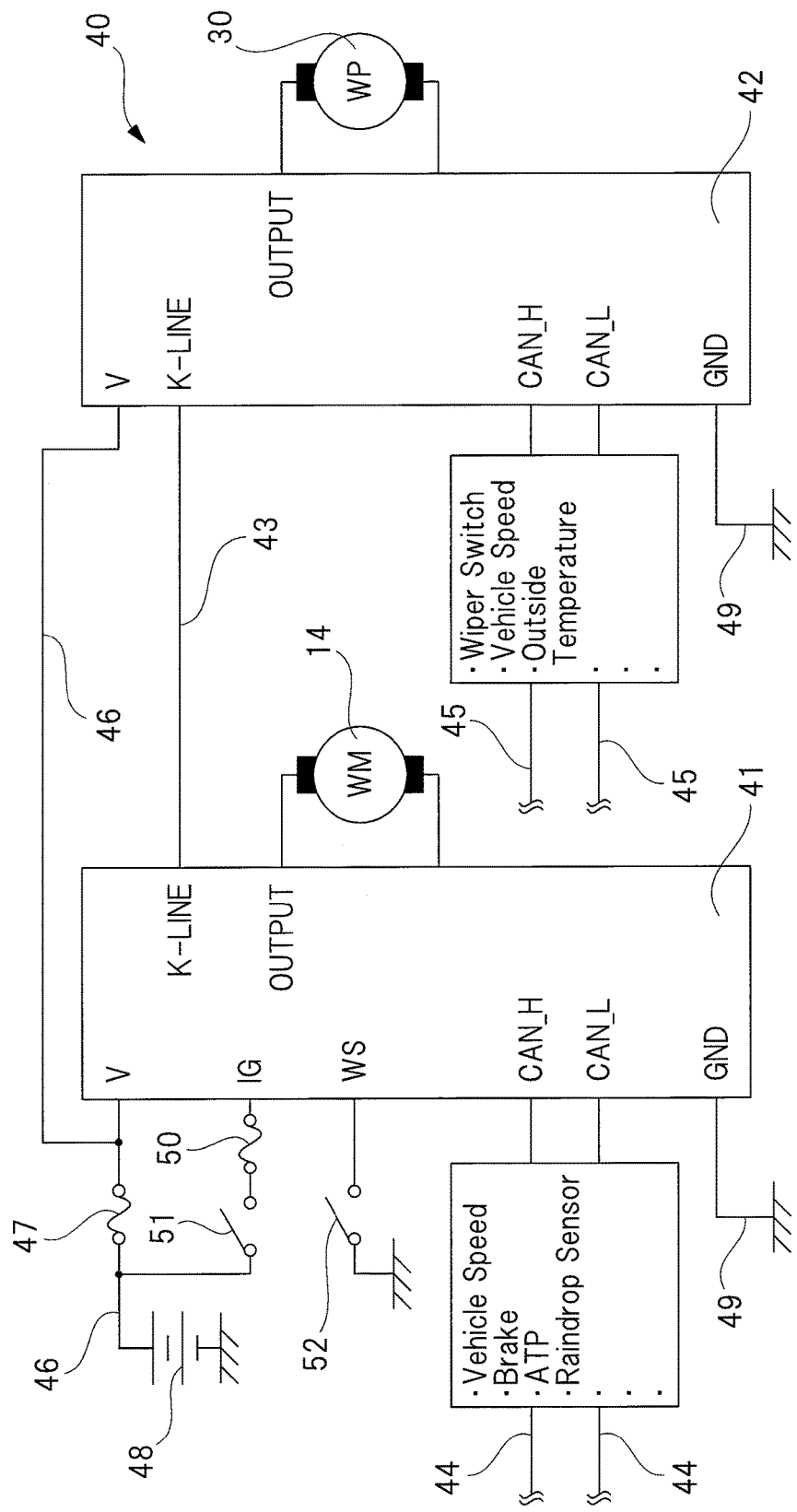
FIG. 2 is a view of a drive circuit of the wiper control apparatus of FIG. 1.
Figure 3:
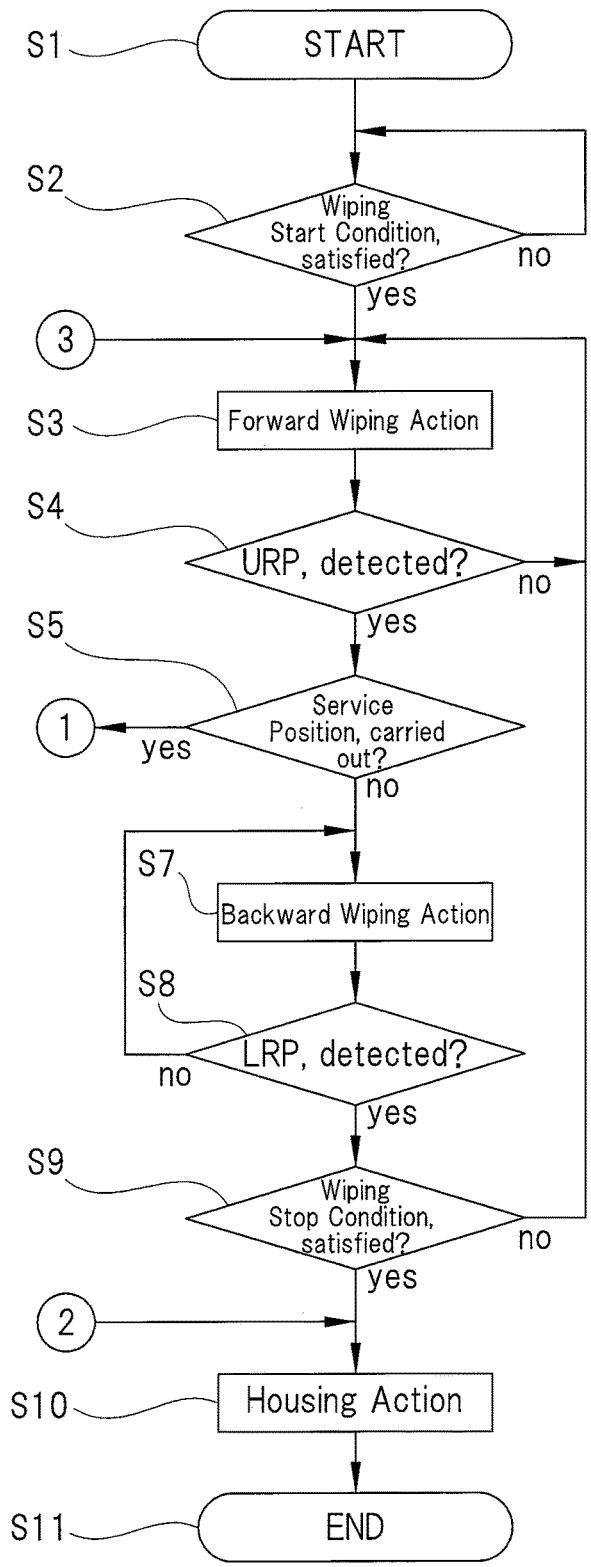
FIG. 3 is a flowchart of an operation of the wiper control apparatus according to the first embodiment.
Figure 4:
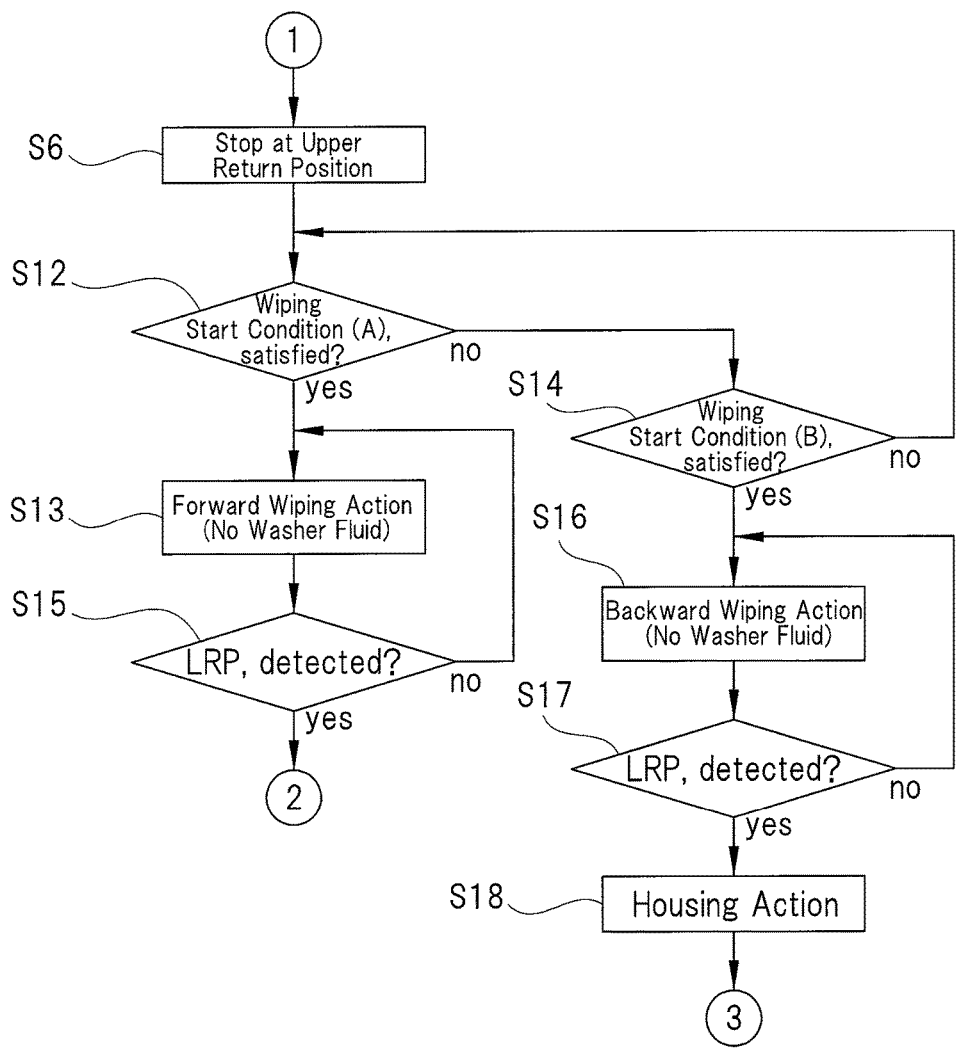
FIG. 4 is a flowchart following the flowchart of FIG. 3.
Figure 5:
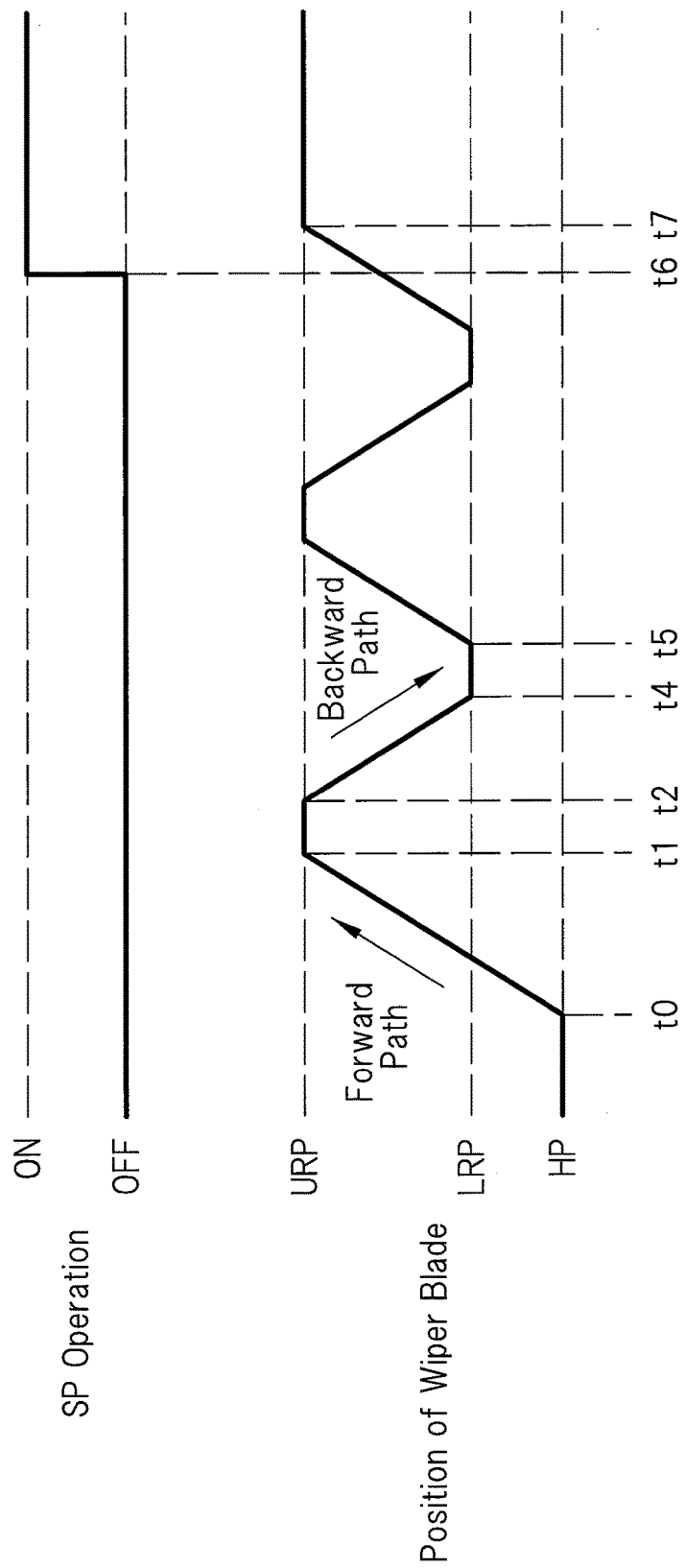
FIG. 5 is a time chart showing an angle of a shaft of a wiper motor when a service position (SP) operation is carried out in the midst of swinging motion.
Figure 6:
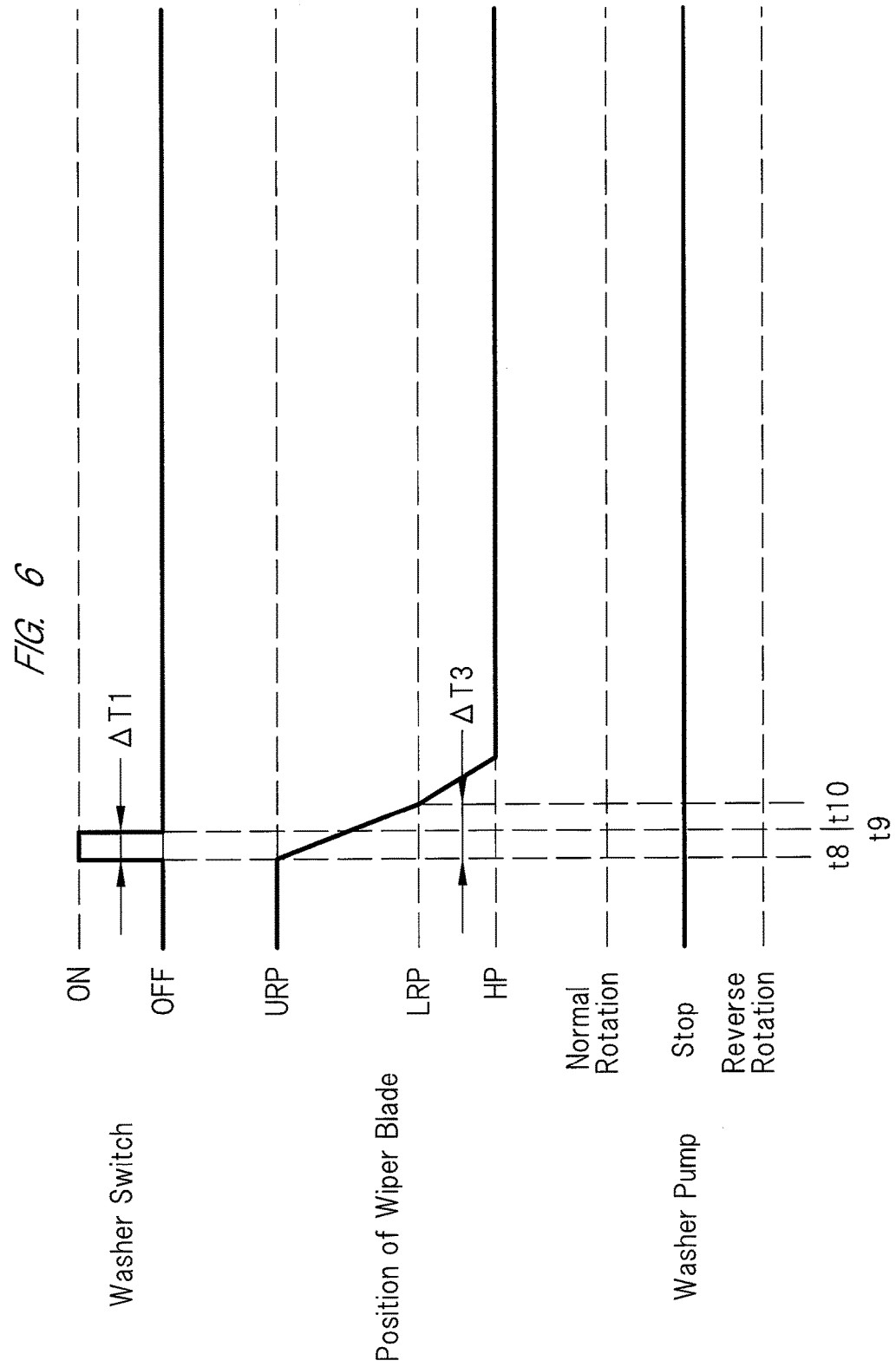
FIG. 6 is a time chart showing an operation of a washer pump, which results when the SP operation is canceled by operating a washer switch for an extremely short time (ΔT1)
Figure 7:
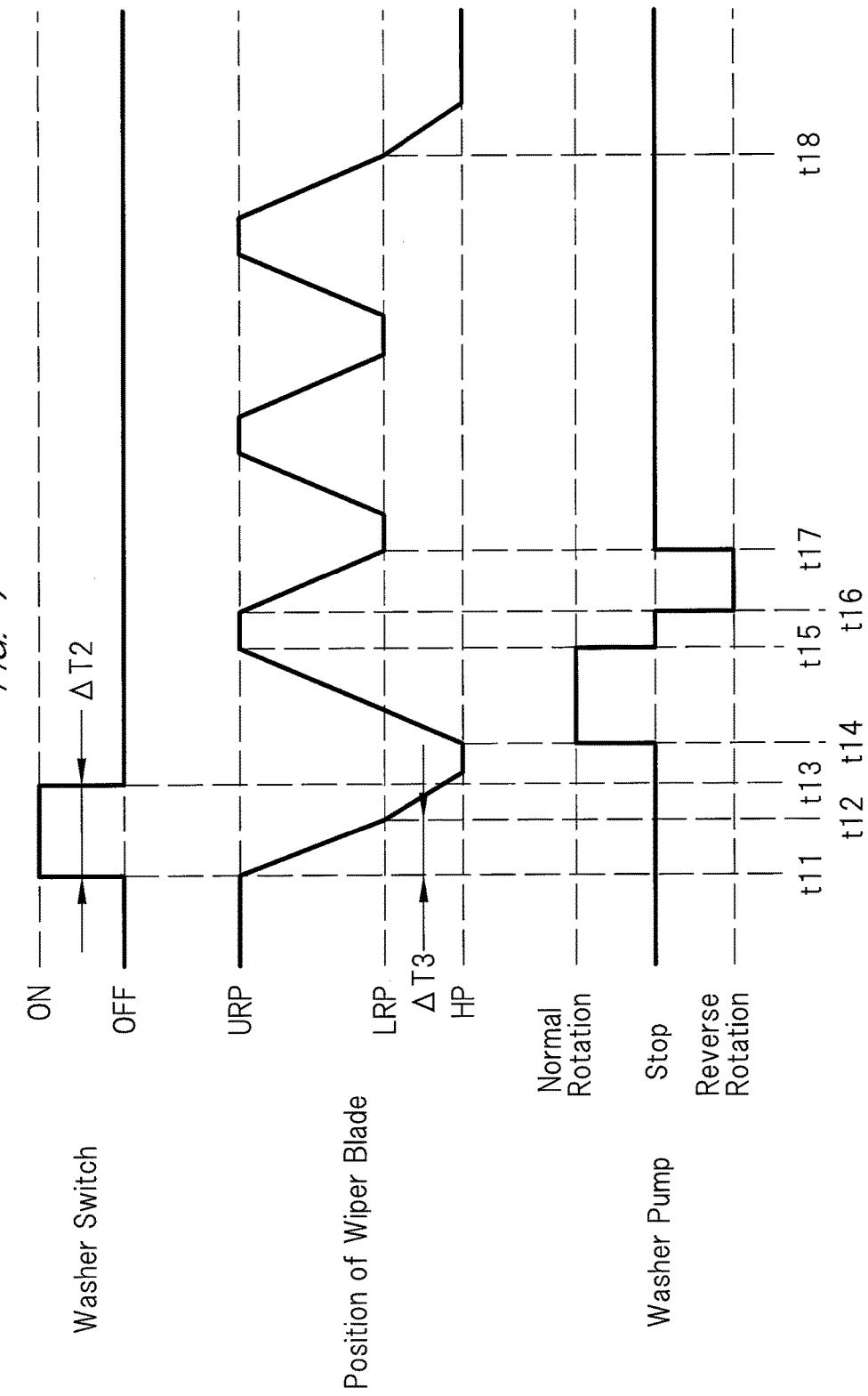
FIG. 7 is a time chart showing the operation of the washer pump, which results when the SP operation is canceled by operating the washer switch for a short time (ΔT3)

FIG. 1 is a schematic view of a wiper control apparatus disposed on a vehicle; FIG. 2 is a view of a drive circuit of the wiper control apparatus of FIG. 1; FIG. 3 is a flowchart of an operation of the wiper control apparatus according to the first embodiment; FIG. 4 is a flowchart following the flowchart of FIG. 3; FIG. 5 is a time chart showing an angle of a shaft of a wiper motor when a service position (SP) operation is carried out in the midst of swinging motion; FIG. 6 is a time chart showing an operation of a washer pump, which results when the SP operation is canceled by operating a washer switch for an extremely short time (ΔT1); and FIG. 7 is a time chart showing the operation of the washer pump, which results when the SP operation is canceled by operating the washer switch for a short time (ΔT3).

As shown in FIG. 1, a vehicle 10 such as automotive vehicle has a front windshield (subject surface to be wiped) 11 formed on a front side thereof. In front of the front windshield 11, a wiper control apparatus 12 is disposed, which wipes rainwater, dust, etc., away from the front windshield 11 to ensure a field of view from a driver and the like through the windshield. The wiper control apparatus 12 includes a wiper drive mechanism 13 which is mounted in a bulkhead (not shown) forming an engine room of the vehicle 10.

The wiper drive mechanism 13 has a wiper motor (motor) 14 driven to be rotated by operating a wiper switch 52 (see FIG. 2) disposed in the vehicle interior, a pair of pivot shafts 15 rotatably attached to the vehicle 10, a pair of wiper members 20 having base ends fixed to the respective pivot shafts 15 and front ends to be swung on the front windshield 11, and a power transmitting mechanism 16 which transmits output power from the wiper motor 14 to each of the pivot shafts 15.

Each of the wiper members 20 has a wiper arm 21, a wiper blade 22, and a washer nozzle 23. The base end portion of the wiper arm 21 is fixed to the pivot 15. The front end portion of the wiper arm 21 is fitted with the wiper blade 22, and the wiper blade 22 is pivotally movable relative to the vertical direction of the front windshield 11. The wiper blade 22 is pressed against the front windshield 11 by a spring force of a tensile spring (not shown) disposed inside the wiper arm 21. By driving the wiper motor 14, the wiper blades 22 are caused to make reciprocating wiping actions in a pair of wipe ranges 17 on the front windshield 11.

The washer nozzle 23 is disposed along a longitudinal direction of the wiper blade 22, and attached to the front end side of the wiper arm 21. The washer nozzle 23 has a forward-side washer nozzle 23a and a backward-side washer nozzle 23b. The forward-side washer nozzle 23a is disposed closer to an upper return position URP (that is, disposed on the forward-side) of the wipe range 17 than the wiper blade 22, while the backward-side washer nozzle 23b is disposed closer to a lower return position LRP (that is, disposed on the backward-side) of the wipe range 17 than the wiper blade 22.

Within an area lower than the lower return position LRP shown in FIG. 1 (closer to the engine room), a housing position HP is provided, in which the wiper blade 22 is housed when the wiper motor 14 is stopped. This housing position HP is provided in a location hardly visible from outside the vehicle 10. As a result, when the wiper motor 14 is stopped, the wiper blade 22 is concealed to improve the appearance of the vehicle 10.

To the forward-side washer nozzle 23a and the backward-side washer nozzle 23b, one longitudinal end side (upper side in figure) of the forward-side washer tube 24a and the same of the backward-side washer tube 24b are respectively connected. The other longitudinal end side (lower side in figure) of the forward-side washer tube 24a and the same of the backward-side washer tube 24b are lead through the interior of the wiper arm 21 into the engine room. The other longitudinal end side of each washer tube 24a and 24b is connected to a washer pump (pump) 30 disposed close to the wiper drive mechanism 13.

The washer pump 30 is fitted to a washer tank 31 holding washer fluid "W". Therefore, by driving the washer pump 30, washer fluid "W" is supplied to each washer tube 24a and 24b, and jetted from a plurality of injection holes (not shown) formed on the forward-side washer nozzle 23a and on the backward-side washer nozzle 23b. The washer pump 30, the washer tank 31, and the washer tubes 24a and 24b form part of the wiper control apparatus 12.

The injection holes formed on the washer tubes 24a and 24b are directed in directions different form each other, and so as to wet a large area in the wipe range 17 with washer fluid "W". For example, as indicated by broken line arrows in FIG. 1, an injection hole located on the outer circumferential side (upper side in figure) of the backward-side washer nozzle 23b is directed toward the outer circumference of the wipe range 17, an injection hole located on the inner circumferential side (lower side in figure) of the backward-side washer nozzle 23b is directed toward the inner circumference of the wipe range 17, and an injection hole located at the center in the longitudinal direction of the backward-side washer nozzle 23b is directed toward a center portion of the wipe range 17.

By driving the washer pump 30 in a normal rotation direction, washer fluid "W" is jetted from each injection hole of the forward-side washer nozzle 23a. By driving the washer pump 30 in a reverse rotation direction, on the other hand, washer fluid "W" is jetted from each injection hole of the backward-side washer nozzle 23b. A driving direction of the washer pump 30 is switched on the basis of a drive signal from the wiper motor 14. Switching of the driving direction of the washer pump 30 will be described later.

Each of the wiper motor 14 and the washer pump 30 is driven by a drive circuit 40 shown in FIG. 2. The drive circuit 40 has an ECU 41 for wiper motor (first controller) and an ECU 42 for washer pump (second controller). The ECU 41 for wiper motor is mounted on a board 14b (see FIG. 1) housed in a housing 14a of the wiper motor 14. The ECU 42 for washer pump is mounted on a board 30b (see FIG. 1) housed in a housing 30a of the washer pump 30.

The ECU 41 for wiper motor is connected to the ECU 42 for washer pump via a communication line 43. A "K-LINE" bus, which is a low transmission rate diagnostic bus which can be built at low cost, is adopted as communication means, i.e., a communication line 43 between the ECU 41 for wiper motor and the ECU 42 for washer pump. From the ECU 41 for wiper motor to the ECU 42 for washer pump, a wiper motor sequence signal (WS signal) and an ignition switch signal (IG signal) are transmitted via the communication line 43. The WS signal is a drive signal indicative of the drive state of the wiper motor 14. The WS signal includes a moving direction signal indicative of the moving direction of the wiper blade 22, and a position signal indicative of a position of the wiper blade 22 relative to the front windshield 11.

Furthermore, to the ECU 41 for wiper motor and the ECU 42 for washer pump, various information (signals) from the vehicle 10 are input via a pair of communication lines 44 and a pair of communication lines 45. A "CAN" bus enabling high-speed communication is adopted as communication means, i.e., communication lines 44 and 45. To the ECU 41 for wiper motor, a vehicle speed signal indicative of the speed of the vehicle 10, a brake signal, an ATP signal (shift position signal), a rainwater drop sensor signal, etc., via the communication lines 44. To the ECU 42 for washer pump, a wiper switch signal, a vehicle speed signal indicative of the speed of the vehicle 10, an outdoor temperature signal, etc., are input via the communication lines 45. The ECU 41 for wiper motor and the ECU 42 for washer pump thus control the wiper motor 14 and the washer pump 30 in an optimum manner, according to the traveling state, etc., of the vehicle 10.

An in-vehicle battery (power supply) 48 is connected to the ECU 41 for wiper motor and the ECU 42 for washer pump via a power line 46 and a first fuse 47. The ECU 41 for wiper motor and the ECU 42 for washer pump are respectively grounded to the body, etc., (not shown) of the vehicle 10 via ground lines 49. The voltage of the in-vehicle battery 48 is 12 [V].

An ignition switch 51 is connected to the ECU 41 for wiper motor via a second fuse 50, and disposed between the in-vehicle battery 48 and the second fuse 50. By turning on the ignition switch 51, a drive current is supplied to the ECU 41 for wiper motor and the ECU 42 for washer pump, thereby putting them in a stand-by mode.

A wiper switch 52 is connected to the ECU 41 for wiper motor. The wiper switch 52 is a lever-type switch, can be shifted downward by a plurality of steps, and can be pressed upward and on the nearer side. The wiper switch 52 is disposed on a steering column, etc., in the vehicle interior and can be operated into, for example, the following first to fifth states.

The first state is a state in which when the wiper switch 52 is pressed upward to turn on a mist switch, it shifts into a "MIST" mode in which the wiper motor 14 is driven while the wiper switch 52 is pressed upward.

The second state is a state in which when the wiper switch 52 is pressed on the nearer side to turn on a washer switch (injection switch), it shifts into a "WASH" mode in which the washer pump 30 and the wiper motor 14 are driven while the wiper switch 52 is pressed on the nearer side.

The third state is a state in which when the wiper switch 52 is shifted downward by one step from its "OFF" position, it shifts into an "AUTO" mode in which the wiper motor 14 is automatically driven on the basis of a rainwater drop sensor signal.

The fourth state is a state in which when the wiper switch 52 is shifted downward by two steps from its "OFF" position, it shifts into an "LO" mode in which the wiper motor 14 is driven consecutively at low speed.

The fifth state is a state in which when the wiper switch 52 is shifted downward by three steps from its "OFF" position, it shifts into a "HI" mode in which the wiper motor 14 is driven consecutively at high speed.

An operation of the wiper control apparatus 12 configured in the above manner will then be described in detail with reference to the drawings.

As shown in FIG. 3, when the ignition switch 51 is turned on in step S1, the wiper control apparatus 12 is supplied with power, and this means that both of the ECU 41 for wiper motor and the ECU 42 for washer pump are supplied with a drive current. Therefore, the wiper control apparatus 12 starts its control operation (START).

Subsequently, in step S2, the ECU 41 for wiper motor judges whether a wiping start condition for driving the wiper motor 14 is satisfied. In this step, the ECU 41 for wiper motor detects that the wiper switch 52 has been operated from its "OFF" state into any one of the "MIST" mode, the "WASH" mode, the "AUTO" mode, the "LO" mode, and the "HI" mode, thereby judging that the wiping start condition is satisfied. When the wiper switch 52 is operated and put into the "AUTO" mode, a rainwater sensor signal is included in the wiping start condition as condition information. When it is judged in step S2 that the wiping start condition is satisfied (yes), it proceeds to step S3. On the other hand, when it is judged that the wiping start condition is not satisfied (no), it repeats the process of step S2.

In step S3, on the basis of the fact that the wiping start condition is satisfied, the ECU 41 for wiper motor rotates the wiper motor 14 in the normal direction. Therefore, as indicated in a time span between time t0 and time t1 in FIG. 5, the wiper blade 22 makes a wiping action along a forward path from the housing position HP to the upper return position URP.

Subsequently, in step S4, the ECU 41 for wiper motor judges whether the wiper blade 22 has reached the upper return position URP. Here, the position of the wiper blade 22 relative to the front windshield 11 is determined on the basis of a detection signal from a rotation sensor (not shown) which is adapted to detect a rotation state of the output shaft (not shown) of the wiper motor 14. When judging that the wiper blade 22 has reached the upper return position URP, and the wiper blade 22 is in the upper return position URP (yes), it proceeds to step S5. On the other hand, when detecting and judging that the wiper blade 22 is not in the upper return position URP (no), it returns to step S3, causing the wiper motor 14 to keep rotating in the normal direction.

In step S5, the ECU 41 for wiper motor judges whether a service position operation (SP operation) has been carried out. When judging in step S5 that the SP operation has been carried out (yes), it proceeds to step S6 shown in FIG. 4. On the other hand, when judging in step S5 that the SP operation has not been carried out (no), it proceeds to step S7. The SP operation refers to an operation carried out for replacing the wiper blade 22. By carrying out the SP operation, an interruption process is executed even in the midst of swinging motion of the wiper blade 22, thereby putting the wiper blade 22 into a stop at the upper return position URP. Therefore, this facilitates replacement of the wiper blade 22. According to this embodiment, a condition for allowing the SP operation is that the wiper switch 52 is in a state for the "MIST" mode, and the ignition switch 51 is off. In addition, when detecting this condition, the ECU 41 for wiper motor judges that the SP operation has been carried out.

In step S7, the ECU 41 for wiper motor rotates the wiper motor 14 in a reverse direction. Therefore, as indicated in a time span between time t2 and time t4 in FIG. 5, the wiper blade 22 makes a wiping action along a backward path from the upper return position URP to the lower return position LRP.

Subsequently, in step S8, the ECU 41 for wiper motor judges whether the wiper blade 22 has reached the lower return position LRP, on the basis of a detection signal from the rotation sensor of the wiper motor 14. When judging that the wiper blade 22 has reached the lower return position LRP, and the wiper blade 22 is in the lower return position LRP (yes), it proceeds to step S9. When detecting and judging that the wiper blade 22 is not in the lower return position LRP (no), it returns to step S7, and causes the wiper motor 14 to keep rotating in the reverse direction.

In step S9, the ECU 41 for wiper motor judges whether a wiping stop condition for stopping the wiper motor 14 is satisfied, that is, judges whether the wiper switch 52 is put in the "OFF" state. When judging in step S9 that the wiping stop condition is satisfied (yes), it proceeds to step S10. On the other hand, when judging that the wiping stop condition is not satisfied (no), it returns to step S3, and as indicated in a time zone starting from time t5 in FIG. 5, the wiper motor 14 is rotated in the normal direction in order to switch from the backward wiping action to the forward wiping action.

In step S10, a housing operation is carried out to cause the wiper motor 14 to keep rotating in the reverse direction for housing the wiper blade 22. Therefore, the wiper blade 22 is moved to the housing position HP, and then in step S11, the wiper control apparatus 12 ends the wiping operation (END).

When judging in step S5 that the SP operation has been carried out (time t6 in FIG. 5), the ECU 41 for wiper motor stops the wiper blade 22 at the upper return position URP (time 7 in FIG. 5) in step S6 in FIG. 4. This facilitates replacement of the wiper blade 22. The ECU 41 for wiper motor outputs a stop signal for wiper blade replacing (motor stopping signal) to the ECU 42 for washer pump, the stop signal for wiper blade replacing indicting that the wiper blade 22 has been stopped in the midst of swinging motion as a result of execution of the SP operation, that is, the wiper motor 14 is stopped at the upper return position URP as a result of the (yes) judgment in step S5. The stop signal for wiper blade replacing is treated as a WS signal, and transmitted to the ECU 42 for washer pump via the communication line 43, which is the K-LINE bus.

Subsequently, in step S12, the ECU 41 for wiper motor judges whether a wiping start condition (A) is satisfied. When judging in step S12 that the wiping start condition (A) is satisfied (yes), it proceeds to step S13. On the other hand, when judging that the wiping start condition (A) is not satisfied (no), it proceeds to step S14. Here, the wiping start condition (A) is a condition that, as shown in FIG. 6, the wiper switch 52 is put in a state for the "WASH" mode to rotate the wiper motor 14 in the reverse direction during a time span between time t8 and time t9 (extremely short time span ΔT1) after replacement of the wiper blade 22.

In step S13, the ECU 41 for wiper motor rotates the wiper motor 14 in the reverse direction to move the wiper blade 22 from the upper return position URP through the lower return position LRP to the housing position HP. In this process, a trigger event which causes the reverse rotation of the wiper motor 14 is the wiper switch 52 having been put in the state for the "WASH" mode. At this point of time, however, the stop signal for wiper blade replacing from the ECU 41 for wiper motor is already input to the ECU 42 for washer pump by the process of step S6. During the backward wiping action in step S13, therefore, the ECU 42 for washer pump keeps the washer pump 30 stopped to prevent it from jetting washer fluid "W" despite the fact that the wiper switch 52 is in the state for the "WASH" mode, thus preventing the waste of washer fluid "W".

Subsequently, in step S15, the ECU 41 for wiper motor judges whether the wiper blade 22 has reached the lower return position LRP, on the basis of a detection signal from the rotation sensor for the wiper motor 14. When detecting and judging that the wiper blade 22 has reached the lower return position LRP, and the wiper blade 22 is in the lower return position LRP (yes), it proceeds to step S10 of FIG. 3. On the other hand, when detecting and judging that the wiper blade 22 has not reached the lower return position LRP (no), it returns to step S13, and causes the wiper motor 14 to keep rotating in the reverse direction with the washer pump 30 stopped.

In step S14, the ECU 41 for wiper motor judges whether a wiping start condition (B) is satisfied. When judging in step S14 that the wiping start condition (B) is satisfied (yes), it proceeds to step S16. On the other hand, when judging that the wiping start condition (B) is not satisfied (no), it returns to step S12. Here, the wiping start condition (B) is a condition under which, as shown in FIG. 7, the wiper switch 52 is put in the state for the "WASH" mode to rotate the wiper motor 14 in the reverse direction during a time span between time t11 and time t13 (short time span ΔT2) after replacement of the wiper blade 22. The short time span ΔT2, which is a criteria for judging that the wiping start condition (B) is satisfied, is larger than the extremely short time span ΔT1 (see FIG. 6), which is a criteria for judging that the wiping start condition (A) is satisfied (ΔT2>ΔT1).

In step S16, the ECU 41 for wiper motor carries out the same process as that of step S13. During the backward wiping action in step S16, therefore, the washer pump 30 is kept stopped to prevent it from jetting washer fluid "W", which prevents the waste of washer fluid "W".

In step S17, the ECU 41 for wiper motor carries out the same process as that of step S15. When detecting and judging that the wiper blade 22 is in the lower return position LRP (yes), it proceeds to step S18. When detecting and judging that the wiper blade 22 is in the lower return position LRP (no), it returns to step S16.

In step S18, a housing action is carried out to keep the wiper motor 14 rotating in the reverse direction to house the wiper blade 22. The wiper blade 22 is thus moved to the housing position HP, and it proceeds to step S3 of FIG. 3. During the housing action in step S18, the ECU 41 for wiper motor carries out a process of resetting the stop signal for wiper blade replacing input to the ECU 42 for washer pump. This means that in step 3 and other steps to follow, the ECU 42 for washer pump rotates the washer pump 30 in the normal or reverse direction to cause it to jet out washer fluid "W" (from time t14 onward in FIG. 7).

From time t14 to time t15 of FIG. 7, the process of steps S3 and S4 are repeated. Specifically, the ECU 41 for wiper motor rotates the wiper motor 14 in the normal direction, thereby causing the wiper blade 22 to move to the upper return position URP. Meanwhile, as a result of putting the wiper switch 52 in the state for the "WASH" mode during the short time span ΔT2, the ECU 42 for washer pump drives the washer pump 30 in the normal direction, thereby causing washer fluid "W" to jet out from each hole of the forward-side washer nozzle 23a (see FIG. 1). Hence dust, etc., is wiped completely away from the front windshield 11 (see FIG. 1).

From time t16 to time t17 of FIG. 7, the process of steps S7 and S8 are repeated. Specifically, the ECU 41 for wiper motor rotates the wiper motor 14 in the reverse direction, thereby causing the wiper blade 22 to move to the lower return position LRP. Meanwhile, as a result of putting the wiper switch 52 in the state for the "WASH" mode during the short time span ΔT2, the ECU 42 for washer pump drives the washer pump 30 in the reverse direction, thereby causing washer fluid "W" to jet out from each injection hole of the backward-side washer nozzle 23b (see FIG. 1). Hence dust, etc., is wiped completely away from the front windshield 11 (see FIG. 1).

From time t17 onward in FIG. 7, the ECU 41 for wiper motor and the ECU 42 for washer pump judge that the wiping stop condition is satisfied in step S9. Here, the wiping stop condition in this control period is that the wiper blade 22 has made one cycle of reciprocating wiping action as the washer pump 30 has been driven (from time t14 to time t17). Subsequently, in step S9, the ECU 41 for wiper motor causes the wiper blade 22 to make two cycles of reciprocating wiping action, which completely wipes the remaining washer fluid "W", etc., away from the front windshield 11. Subsequently, in step S10, the ECU 41 for wiper motor causes the wiper blade 22 to make the housing action (from time 18 onward).

Here, the extremely short time span ΔT1 (see FIG. 6), which is a criteria for judging that the wiping start condition (A) is satisfied, is determined to be shorter than a time span ΔT3 (from time t8 to time t10 in FIG. 6) that the wiper blade 22 needs to move from the upper return position URP to the lower return position LRP when the wiper motor 14 is rotated in the reverse direction (ΔT1<ΔT3).

On the other hand, the short time span ΔT2 (see FIG. 7), which is a criteria for judging that the wiping start condition (B) is satisfied, is determined to be longer than the time span ΔT3 (from time t11 to time t12 in FIG. 7) that the wiper blade 22 needs to move from the upper return position URP to the lower return position LRP when the wiper motor 14 is rotated in the reverse direction (ΔT2>ΔT3).

That is, this time span setting allows the ECU 41 for wiper motor to compare the extremely short time span ΔT1, which is a criteria for judging that the wiping start condition (A) is satisfied, the short time span ΔT2, which is a criteria for judging that the wiping start condition (B) is satisfied, and the time span ΔT3 that the wiper blade 22 needs to move from the upper return position URP to the lower return position LRP, with each other. Through this comparison, the ECU 41 for wiper motor identifies an operation to follow replacement of the wiper blade 22, which is a "housing operation" to follow when the wiping start condition (A) is satisfied, or a "cleaning operation" to follow when the wiping start condition (B) is satisfied.

As described above in detail, according to the wiper control apparatus 12 of the first embodiment, when detecting execution of the SP operation in the midst of swinging motion of the wiper blade 22, the ECU 41 for wiper motor outputs a stop signal for wiper blade replacing to the ECU 42 for washer pump. When receiving the stop signal for wiper blade replacing, the ECU 42 for washer pump stops the washer pump 30 even if the washer switch for jetting washer fluid "W" is on.

Thus, when the wiper blade 22 is stopped from being swung for replacement, the washer pump 30 which causes washer fluid "W" to jet out is also stopped. This prevents the waste of washer fluid "W", thus saving washer fluid "W".

Furthermore, according to the wiper control apparatus 12 of the first embodiment, the washer nozzle 23 is composed of the forward-side washer nozzle 23a disposed on the forward-end side of the wiper blade 22 and the backward-side washer nozzle 23b disposed on the backward side of the wiper blade 22. The ECU 42 for washer pump rotates the washer pump 30 in the normal direction to jet washer fluid "W" from the forward-side washer nozzle 23a when the washer switch is turned on and the wiper blade 22 is moved in the forward direction, and it rotates the washer pump 30 in the reverse direction to jet washer fluid "W" from the backward-side washer nozzle 23b when the washer switch is turned on and the wiper blade 22 is moved in the backward direction.

In this manner, washer fluid "W" is jetted only in the moving direction of the wiper blade 22. This prevents the waste of washer fluid "W", thus further saving washer fluid "W".

Next, the second embodiment of the present invention will be described in detail with reference to the drawings, members and portions the same in function as those of the first embodiment are denoted by the same reference numbers, and the detail descriptions thereof are omitted in this embodiment.

Figure 8:
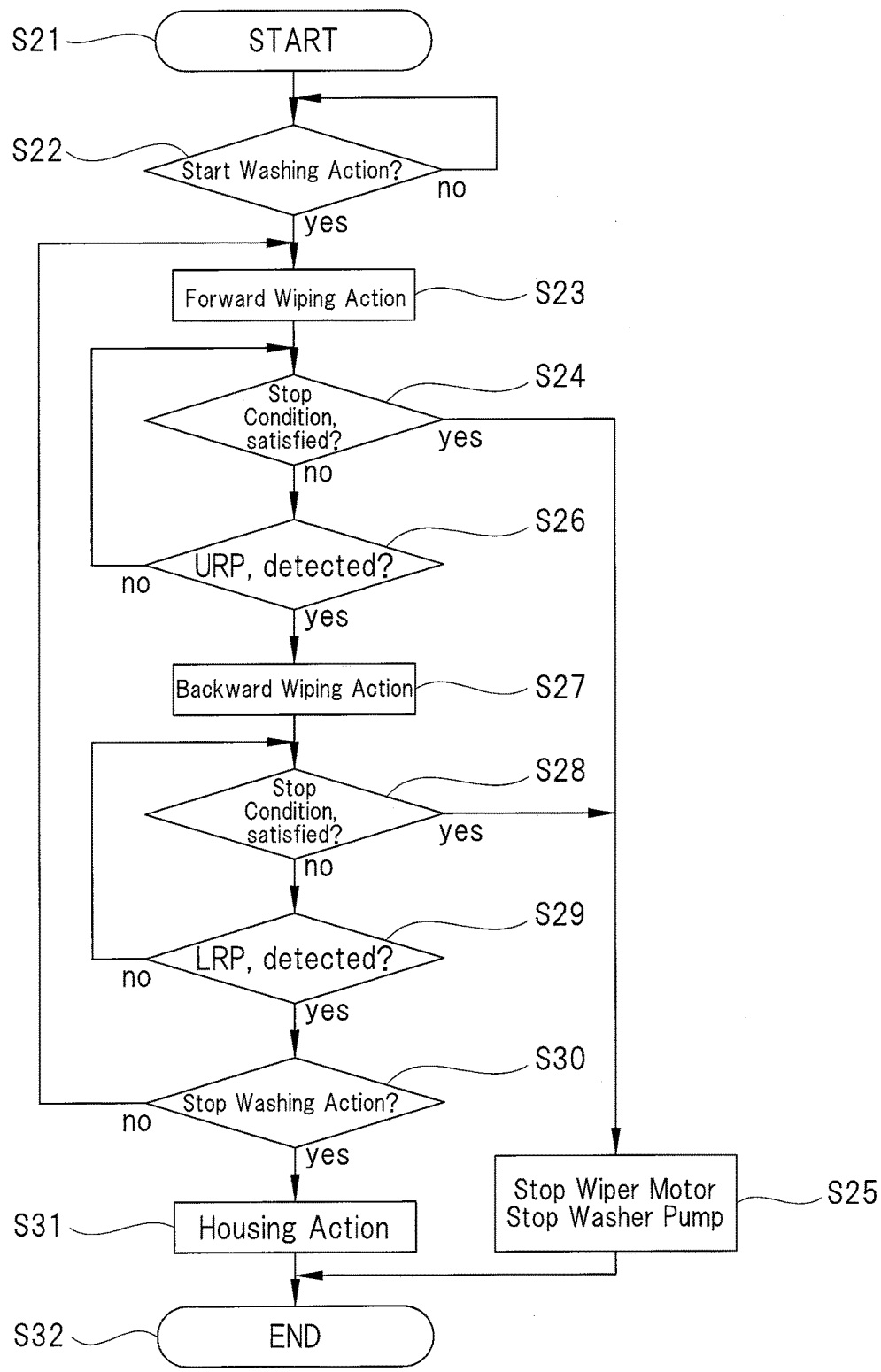
FIG. 8 is a flowchart of an operation of a wiper control apparatus according to the second embodiment.
Figure 9:
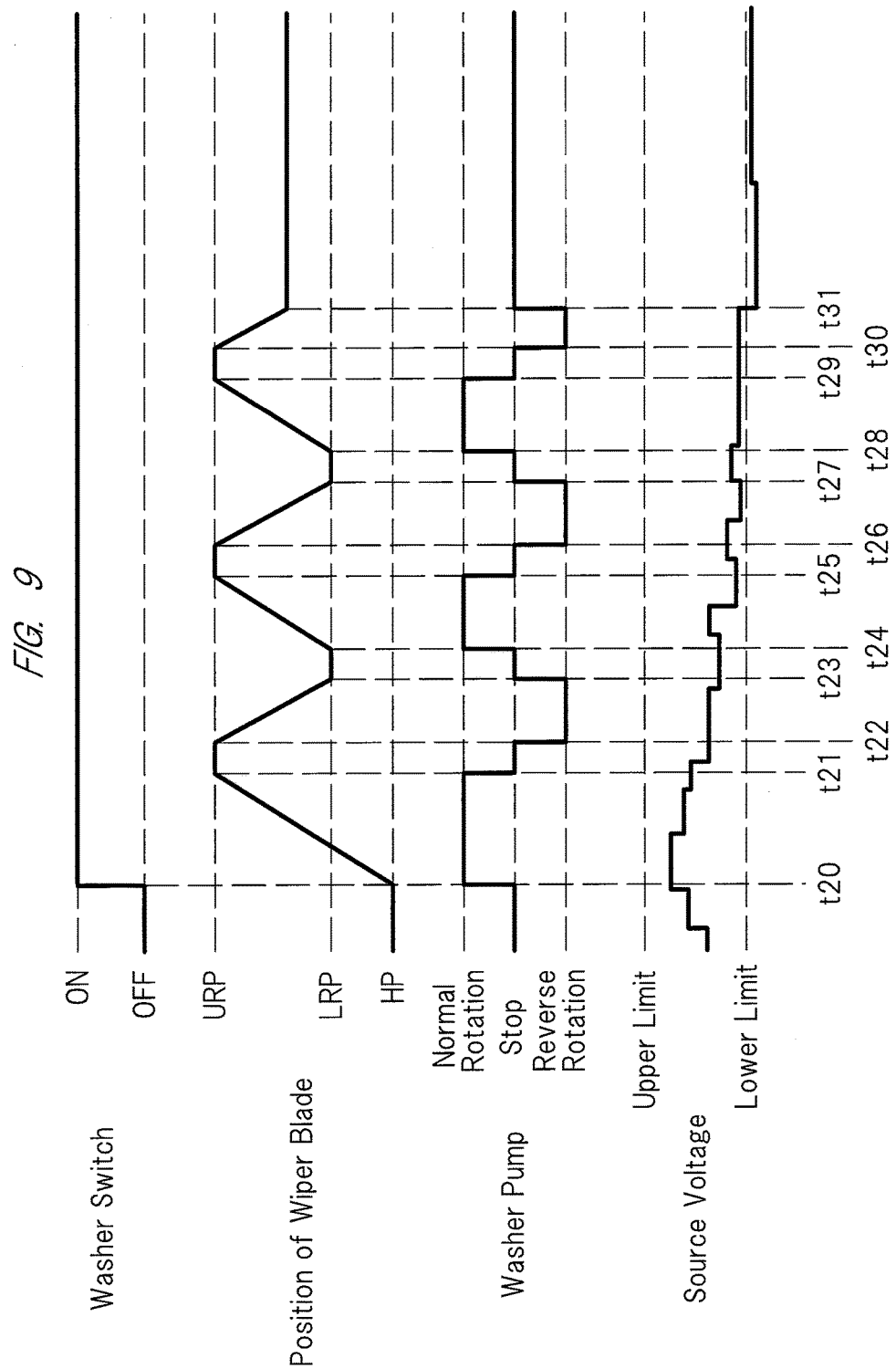
FIG. 9 is a time chart showing an operation of the wiper motor and washer pump that result with a source voltage taking an abnormal voltage value.

FIG. 8 is a flowchart of an operation of a wiper control apparatus according to the second embodiment, and FIG. 9 is a time chart showing an operation of the wiper motor and washer pump that result with a source voltage taking an abnormal voltage value.

The wiper control apparatus 12 according to the second embodiment is different from that of the first embodiment in control which is carried out by the driving circuit 40 shown in FIG. 2. Hereinafter, an operation of the wiper control apparatus 12 according to the second embodiment will be described.

Firstly, as shown in FIG. 8, when the ignition switch 51 is turned on in step S1, the wiper control apparatus 12 is supplied with power, and this means that both of the ECU 41 for wiper motor and the ECU 42 for washer pump are supplied with a drive current. Therefore, the wiper control apparatus 12 starts its control operation (START).

Subsequently, in step S22, the ECU 41 for wiper motor judges whether cleaning of the front windshield 11 is started. Specifically, the ECU 41 for wiper motor judges whether the wiper switch 52 in its "OFF" state is operated into the state for the "WASH" mode. When judging in step S22 that cleaning of the front windshield 11 is started (yes), it proceeds to step S23. When judging in step S22 that cleaning of the front windshield 11 is not started (no), it repeats the process of step S22.

In step S23, the ECU 41 for wiper motor causes the wiper motor 14 to rotate in the normal direction. The ECU 42 for washer pump, on the other hand, drives the washer pump 30 in the normal direction to cause washer fluid "W" to jet out from each injection hole of the forward-side washer nozzle 23a. As a result, as indicated by a time span between time t20 and time t21 in FIG. 9, the wiper blade 22 makes a forward wiping action, moving from the housing position HP to the upper return position URP to clean up the front windshield 11.

Subsequently, in step S24, the ECU 41 for wiper motor judges whether a condition for stopping the wiper motor 14 has arisen. This judgment in step S24 is a judgment on whether the voltage of the in-vehicle battery 48 or a voltage generated by an alternator (not shown), both voltages being collectively referred to as source voltage, has come out from a predetermined voltage range (threshold range) to take an abnormal voltage value. A voltage signal indicative of the current state of the source voltage is input to the ECU 41 for wiper motor via the communication line 44, i.e., CAN bus. The voltage range is equivalent to the range between the upper limit and lower limit of the source voltage shown in FIG. 9. The upper limit of the voltage range is set to, for example, 16.5[V] or higher, while the lower limit of the same is set to, for example, 9.5[V] or lower. A release voltage on the upper limit side is set to, for example, 16.0 V or lower, while the same on the lower limit side is set to, for example, 10.0[V] or higher.

Then, when judging in step S24 that the wiper motor stopping condition has arisen, that is, judging that the current source voltage is out of the voltage range, i.e., an abnormal voltage value (yes), it proceeds to step S25. When judging in step S24 that the wiper motor stopping condition has not arisen, that is, judging that the current source voltage is within the voltage range, i.e., a normal voltage value (no), it proceeds to step S26.

In step S25, the ECU 41 for wiper motor stops the wiper motor 14, and outputs a power supply cutoff signal (motor stopping signal) indicative of cut off of power supply to the wiper motor 14, to the ECU 42 for washer pump. The power supply cutoff signal is treated as a WS signal, and transmitted to the ECU 42 for washer pump via the communication line 43, i.e., K-LINE bus.

Therefore, when receiving the power supply cutoff signal, the ECU 42 for washer pump stops the washer pump 30. The (yes) judgment in step S24 and the process in step S25 following step S24 are indicated in a time zone stating from time t31 in the time chart of FIG. 9. FIG. 9 shows that the source voltage drops below its lower limit of 9.5[V] or lower to become out of the voltage range, and in spite of the fact that the wiper switch 52 is in the state for the "WASH" mode, the wiper motor 14 and the washer pump 30 are both stopped. Subsequently, it proceeds to step S32, and ends its cleaning action (END).

In step S26, the ECU 41 for wiper motor judges whether the wiper blade 22 has reached the upper return position URP, on the basis of a detection signal from the rotation sensor of the wiper motor 14. When detecting and judging (yes) that the wiper blade 22 has reached the upper return position URP, and the wiper blade 22 is in the upper return position URP, it proceeds to step S27. On the other hand, when detecting and judging (no) that the wiper blade 22 is in the upper return position URP, it returns to step S24, and causes the wiper motor 14 to keep rotating in the normal direction while causing the washer pump 30 to keep operating in the normal direction.

In step S27, the ECU 41 for wiper motor causes the wiper motor 14 to be rotated in the reverse direction. The ECU 42 for washer pump, on the other hand, drives the washer pump 30 in the reverse direction to cause washer fluid "W" to jet out from each injection hole of the backward-side washer nozzle 23b. As a result, as indicated by a time span between time t22 and time t23 in FIG. 9, the wiper blade 22 makes a backward wiping action, and the wiper blade 22 is moved from the upper return position URP to the lower return position LRP to clean up the front windshield 11.

Subsequently, in step S28, the same process as that of step S24 is carried out. The ECU 41 for wiper motor, therefore, judges whether a condition for stopping the wiper motor 14 has arisen. When judging in step S28 that the current source voltage is out of the voltage range (yes), it proceeds to step S25. On the other hand, when judging in step S28 that the current source voltage is within the voltage range (no), it proceeds to step S29.

In step S29, the ECU 41 for wiper motor judges whether the wiper blade 22 has reached the lower return position LRP, on the basis of a detection signal from the rotation sensor of the wiper motor 14. When detecting and judging that the wiper blade 22 has reached the lower return position LRP, and the wiper blade 22 is in the lower return position LRP (yes), it proceeds to step S30. On the other hand, when detecting and judging that the wiper blade 22 has not reached the lower return position LRP (no), it returns to step S28, and causes the wiper motor 14 to keep rotating in the reverse direction while causing the washer pump 30 to keep operating in the reverse direction.

In step S30, the wiper control apparatus 12 judges whether cleaning of the front windshield 11 has been stopped, that is, specifically, judges whether the wiper switch 52 in its state for the "WASH" mode has been operated into the "OFF" state. When judging in step S30 that the cleaning has been stopped (yes), it proceeds to step S31. On the other hand, when judging in step S30 that the cleaning has not been stopped (no), it returns to step S23, and causes the wiper motor 14 to rotate in the normal direction to switch from a backward wiping action to a forward wiping action while causing the washer pump 30 to operate in the normal direction, as indicated by a time zone starting from time t24 in FIG. 9. When the source voltage is within the voltage range, that is, takes a normal voltage value and the wiper switch 52 is kept in the state for the "WASH" mode, the process of steps S23 to S30 are repeated, in which case the wiper control apparatus 12 makes actions indicated in a time span between time t24 and time t30 in FIG. 9.

In step S31, a housing action for hosing the wiper blade 22 is carried out to cause the wiper motor 14 to keep rotating in the reverse direction while keeping the washer pump 30 stopped. This housing action moves the wiper blade 22 to the housing position HP, and then the wiper control apparatus 12 ends its cleaning action in step S32.

As described in detail above, according to the wiper control apparatus 12 of the second embodiment, when detecting the source voltage becoming out of the voltage range in the midst of swinging motion of the wiper blade 22, the ECU 41 for wiper motor stops the wiper motor 14 while outputting a power supply cutoff signal to the ECU 42 for washer pump. When receiving the power supply cutoff signal, the ECU 42 for washer pump stops the washer pump 30 even if the washer switch for jetting washer fluid "W" is on.

In this manner, when the source voltage for the wiper blade 22 is out of the threshold range (abnormal voltage value), the washer pump 30 which causes washer fluid "W" to jet out is stopped in synchronization with the stoppage of the wiper motor 14 as a trigger event. Therefore, even if an individual difference between the ECU 41 for wiper motor and the ECU 42 for washer pump leads to an error between a source voltage value recognized by the ECU 41 and a source voltage value recognized by the ECU 42, the wiper motor 14 and the washer pump 30 can be certainly stopped almost simultaneously. This eliminates a case where the washer pump 30 only is still driven when the source voltage takes an abnormal value. Hence the waste of washer fluid "W" is certainly prevented, which allows further saving of washer fluid "W".

In addition, according to this embodiment, the upper limit of the voltage range (threshold range) is set to 16.5[V] or higher. This upper limit is set for protecting the wiper motor 14 and the washer pump 30 from trouble such as seizing.

Next, the third embodiment of the present invention will be described in detail with reference to the drawings, members and portions the same in function as those of the first embodiment are denoted by the same reference numbers, and the detail descriptions thereof are omitted in this embodiment.

Figure 10:
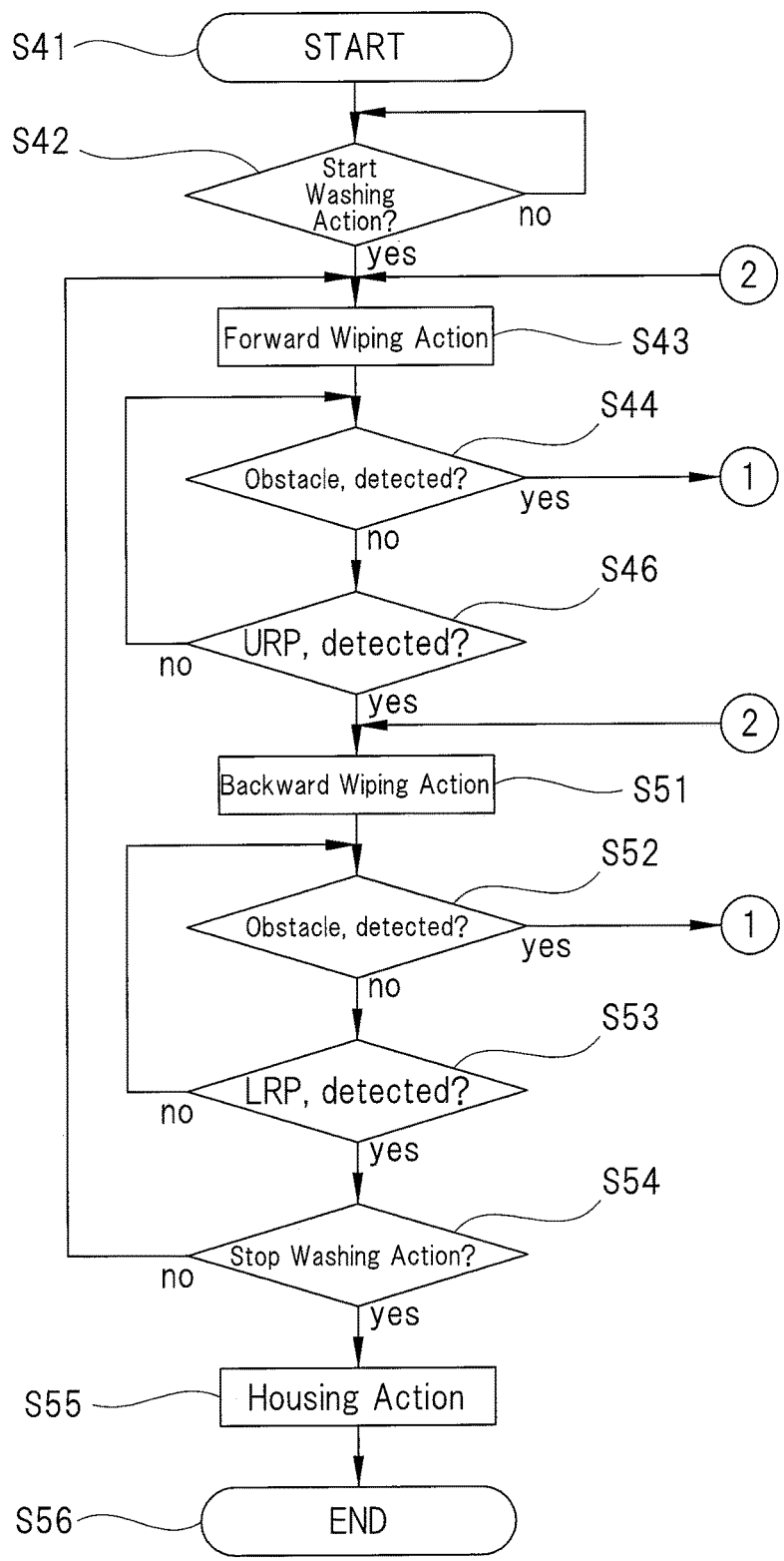
FIG. 10 is a flowchart of an operation of a wiper control apparatus according to the third embodiment.
Figure 11:
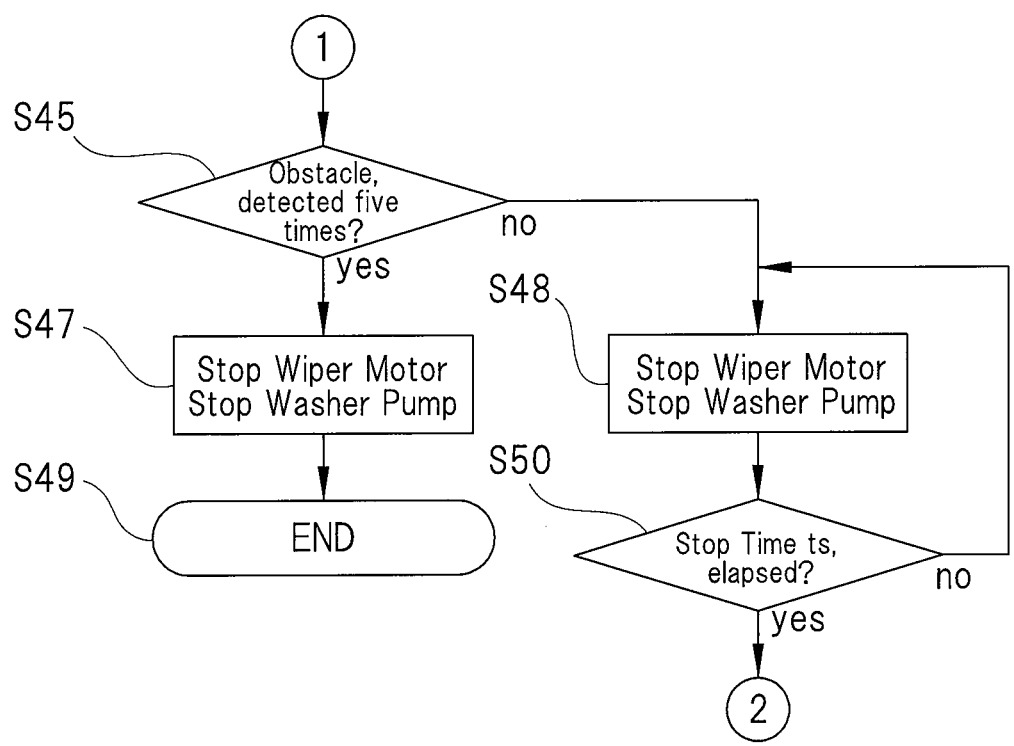
FIG. 11 is a flowchart following the flowchart of FIG. 10.
Figure 12:
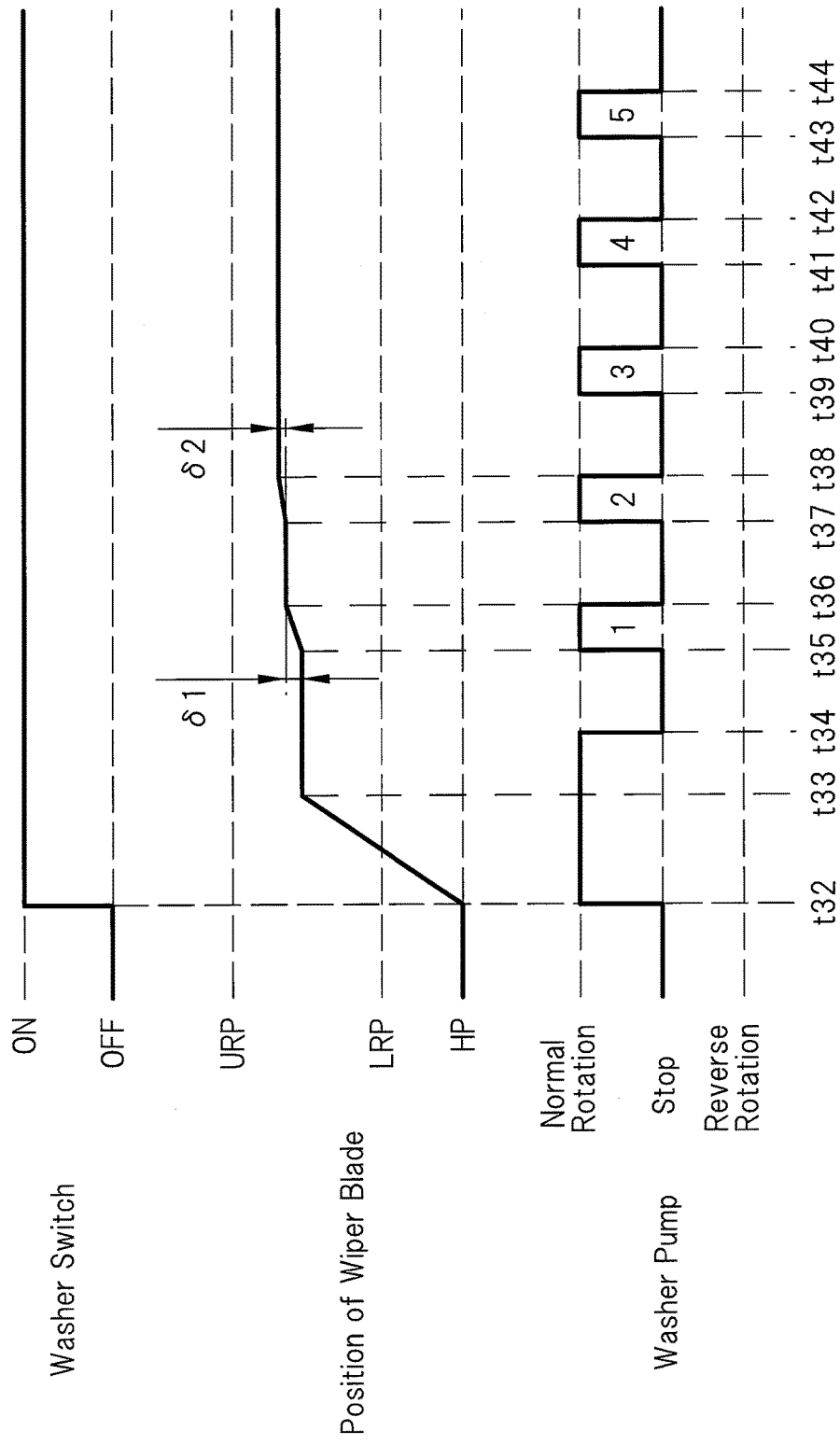
FIG. 12 is a time chart showing operations of the wiper motor and the washer pump with the wiper member stops because of obstacle.

FIG. 10 is a flowchart of an operation of a wiper control apparatus according to the third embodiment, FIG. 11 is a flowchart following the flowchart of FIG. 10, and FIG. 12 is a time chart showing operations of the wiper motor and the washer pump with the wiper stops because of obstacle.

The wiper control apparatus 12 according to the third embodiment is different from that of the first embodiment in control which is carried out by the driving circuit 40 shown in FIG. 2. Hereinafter, an operation of the wiper control apparatus 12 according to the second embodiment will be described.

Firstly, as shown in FIG. 10, when the ignition switch 51 is turned on in step 41, the wiper control apparatus 12 is supplied with power, and this means that both of the ECU 41 for wiper motor and the ECU 42 for washer pump are supplied with a drive current. Therefore, the wiper control apparatus 12 starts its control operation (START).

Subsequently, in step S42, the ECU 41 for wiper motor judges whether cleaning of the front windshield 11 is started. Specifically, the ECU 41 for wiper motor judges whether the wiper switch 52 in its "OFF" state is operated into the state for the "WASH" mode. When judging in step S42 that cleaning of the front windshield 11 is started (yes), it proceeds to step S43. On the other hand, when judging in step S42 that cleaning of the front windshield 11 is not started (no), it repeats the process of step S42.

In step S43, the ECU 41 for wiper motor causes the wiper motor 14 to rotate in the normal direction. The ECU 42 for washer pump, on the other hand, drives the washer pump 30 in the normal direction to cause washer fluid "W" to jet out from each injection hole of the forward-side washer nozzle 23a. As a result, as indicated by a time span between time t30 and time t33 in FIG. 12, the wiper blade 22 makes a forward wiping action, moving from the housing position HP to the upper return position URP to clean up the front windshield 11.

Subsequently, in step S44, the ECU 41 for wiper motor judges whether it has detected obstacle heavy enough to stop the wiper motor 14, that is, judges whether snow, etc., is deposited on the front windshield 11. Specifically, in step S44, on the basis of a detection signal from the rotation sensor of the wiper motor 14, it judges whether the wiper motor 14 is rendered incapable of rotating. When judging in step S44 that obstacle has been detected (yes), it proceeds to step S45 of FIG. 11. On the other hand, when judging in step S44 that obstacle has not been detected (no), it proceeds to step S46.

In step S45, the ECU 41 for wiper motor judges whether it has detected obstacle five times. When judging in step S45 that obstacle has been detected five times (yes), it proceeds to step S47. When judging in step S45 that obstacle has been detected less than five times (no), it proceeds to step S48.

In step S47, the ECU 41 for wiper motor stops the wiper motor 14, and outputs a power supply cutoff signal (motor stopping signal) indicative of cut off of power supply to the wiper motor 14, to the ECU 42 for washer pump. The power supply cutoff signal is treated as a WS signal, and transmitted to the ECU 42 for washer pump via the communication line 43, i.e., K-LINE bus.

Therefore, when receiving the power supply cutoff signal, the ECU 42 for washer pump stops the washer pump 30. The (yes) judgment in step S45 and the process in step S47 following step S45 are indicated in a time zone stating from time t44 in the time chart of FIG. 12. In one example of FIG. 12, although the wiper motor 14 is driven five times from the stopped state so as to try to remove obstacle such as snow, it fails to remove the obstacle, and in spite of the fact that the wiper switch 52 is in the state for the "WASH" mode, the wiper motor 14 and the washer pump 30 are both stopped. Subsequently, it proceeds to step S49, and ends its cleaning action (END). In addition, as shown in FIG. 12, in the washer pump is driven five times in conjunction with the driving operation of the wiper motor 14.

In step S48, similar to the process of step S47, the wiper motor 41 and the washer pump 30 are stopped. Subsequently, in step S50, the ECU 41 for wiper motor judges whether a stop time ts has elapsed. The stop time ts, in which the wiper motor 41 and the washer pump 30 are stopped, is counted by a timer (not shown) attached to the ECU 41 for wiper motor. When judging in step S50 that the stop time ts has elapsed (yes), it proceeds to step S43. When judging in step S50 that the stop time ts has not elapsed (no), it returns to step S48.

In step S26, the ECU 41 for wiper motor judges whether the wiper blade 22 has reached the upper return position URP, on the basis of a detection signal from the rotation sensor of the wiper motor 14. When judging (yes) that the wiper blade 22 has reached the upper return position URP, and the wiper blade 22 is in the upper return position URP, it proceeds to step S51. On the other hand, when judging (no) that the wiper blade 22 is in the upper return position URP, it returns to step S44, and causes the wiper motor 14 to keep rotating in the normal direction while causing the washer pump 30 to keep operating in the normal direction.

In step S51, the ECU 41 for wiper motor causes the wiper motor 14 to be rotated in the reverse direction. The ECU 42 for washer pump, on the other hand, drives the washer pump 30 in the reverse direction to cause washer fluid "W" to jet out from each injection hole of the backward-side washer nozzle 23b. As a result, the wiper blade 22 is moved from the upper return position URP to the lower return position LRP to clean up the front windshield 11.

Subsequently, in step S52, the same process as that of step S44 is carried out. That is, the ECU 41 for wiper motor judges whether it has detected obstacle heavy enough to stop the wiper motor 14. When judging in step S52 that obstacle has been detected (yes), it proceeds to step S45 of FIG. 11. On the other hand, when judging in step S52 that obstacle has not been detected (no), it proceeds to step S53. Here, when the (yes) judgment is made in step S52, process shown in FIG. 11 is carried out, as well as process to be carried out after the (yes) judgment in step S44. After the (yes) judgment in step S52, judgment is made step S50 shown in FIG. 11, and it returns to step S51.

In step S53, the ECU 41 for wiper motor judges whether the wiper blade 22 has reached the lower return position LRP, on the basis of a detection signal from the rotation sensor of the wiper motor 14. When detecting and judging that the wiper blade 22 has reached the lower return position LRP, and the wiper blade 22 is in the lower return position LRP (yes), it proceeds to step S54. On the other hand, when detecting and judging that the wiper blade 22 has not reached the lower return position LRP (no), it returns to step S52, and causes the wiper motor 14 to keep rotating in the reverse direction while causing the washer pump 30 to keep operating in the reverse direction.

In step S54, the wiper control apparatus 12 judges whether cleaning of the front windshield 11 has been stopped, that is, specifically, judges whether the wiper switch 52 in its state for the "WASH" mode has been operated into the "OFF" state. When judging in step S54 that the cleaning has been stopped (yes), it proceeds to step S55. On the other hand, when judging in step S54 that the cleaning has not been stopped (no), it returns to step S53, and causes the wiper motor 14 to rotate in the normal direction to switch from a backward wiping action to a forward wiping action while causing the washer pump 30 to operate in the normal direction.

In step S55, a housing action for hosing the wiper blade 22 is carried out to cause the wiper motor 14 to keep rotating in the reverse direction while keeping the washer pump 30 stopped. This housing action moves the wiper blade 22 to the housing position HP, and then the wiper control apparatus 12 ends its cleaning action in step S56.

Here, in a time span between time t35 and time t36 and a time span between time t37 and time t38, the wiper blade 22 moves slightly toward the upper return position URP by a travel distance δ1 and a travel distance δ2, respectively. This means that the wiper motor 14 is driven twice, and obstacle such as snow is somewhat moved from its stopped state. A time zone starting from time t39 (time of the third drive of the wiper motor onward) in FIG. 12, i.e., time span between time t39 and time t44 indicates that the wiper blade 22 is incapable of moving toward the upper return position URP, which means that obstacle such as snow cannot be eliminated by driving the wiper motor 14.

As described above in detail, according to the third embodiment of the wiper control apparatus 12, when detecting the wiper blade 22 becoming incapable of moving in the midst of swinging motion because of obstacle such as snow, the ECU 41 for wiper motor causes the wiper motor 14 to stop while outputting a power supply cutoff signal to the ECU 42 for washer pump. When receiving the power supply cutoff signal, the ECU 42 for washer pump stops the washer pump 30 even if the washer switch for jetting washer fluid "W" is on.

In this manner, when the wiper blade 22 becomes incapable of moving because of obstacle, the washer pump 30 which causes washer fluid "W" to jet out is stopped in synchronization with the stoppage of the wiper motor 14 as a trigger event. This eliminates a case where the washer pump 30 only is still driven with the wiper blade stopped. Hence the waste of washer fluid "W" is certainly prevented, which allows further saving of washer fluid "W".

The present invention is not limited to the above embodiments, and may obviously be modified into various forms of applications on the condition that the modification does not deviate from the substance of the invention. For example, according to the above embodiments, the wiper control apparatus 12 controls the wipers which wipe a front windshield 11 as a subject surface to be wiped. The wiper control apparatus 12, however, may be applied also to wipers which wipe a rear window as a subject surface to be wiped.

In the above embodiments, the wiper control apparatus 12 incorporated in the vehicle 10 such as automotive vehicle is described. The wiper control apparatus 12 of the present invention, however, may also be used as a wiper control apparatus incorporated in a railroad vehicle, etc.

The wiper control apparatus is incorporated in a vehicle, etc., and used to wipe a subject surface to ensure a better field of view through a windshield.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A wiper control apparatus, comprising:
   a wiper member for wiping a subject surface;
   a wiper motor for swinging the wiper member;
   a first controller for driving the wiper motor;
   a washer nozzle disposed on the wiper member;
   a pump which causes washer fluid to jet out from the washer nozzle; and
   a second controller which drives the pump,
   wherein when detecting that the wiper member is stopped in the midst of a wiping action, the first controller outputs a motor stopping signal to the second controller,
   when receiving the motor stopping signal, the second controller stops the pump even if an injection switch for jetting out washer fluid is on.

2. The wiper control apparatus according to claim 1, wherein
   the washer nozzle is composed of a forward-side washer nozzle disposed on a forward-end side of the wiper member, and a backward-side washer nozzle disposed on a backward side of the wiper member,
   when the injection switch is operated, and the wiper member is moved in a forward direction, the second controller rotates the pump in a normal direction, thereby causing the forward-side washer nozzle to jet out washer fluid,
   when the injection switch is operated, and the wiper member is moved in a backward direction, the second controller rotates the pump in a reverse direction, thereby causing the backward-side washer nozzle to jet out washer fluid.

3. The wiper control apparatus according to claim 1, wherein
   the motor stopping signal is a power supply cutoff signal to be used to cut off power supply to the motor when a source voltage takes an abnormal voltage value, or when the wiper member is incapable of being moved because of obstacle.

* * * * *